Aug. 4, 1964  H. ROHMANN  3,143,036
PHOTOGRAPHIC SLIDE PROJECTOR
Filed Dec. 20, 1960  6 Sheets-Sheet 1

United States Patent Office 3,143,036
Patented Aug. 4, 1964

3,143,036
PHOTOGRAPHIC SLIDE PROJECTOR
Horst Rohmann, Braunschweig, Germany, assignor to Franke & Heidecke, Fabrik Photographischer Präzisions-Apparate, Braunschweig, Germany, a firm of Germany
Filed Dec. 20, 1960, Ser. No. 77,190
Claims priority, application Germany June 1, 1960
2 Claims. (Cl. 88—28)

This invention relates to a projector for projecting photographic slides or transparencies on a viewing screen.

An object of the invention is the provision of a generally improved and more satisfactory projector of this kind.

Another object is the provision of a simple and compact projector adapted to project slides or transparencies of two different sizes.

A further object is the provision of a projector having power driven means for moving individual slides or transparencies from a magazine into projecting position and for moving them back, after projection, into the magazine, this power driven means being capable of handling slides of either one of two different sizes, and also being capable of remote control when desired.

These and other desirable objects may be attained in the manner disclosed as an illustrative embodiment of the invention in the following description and in the accompanying drawings forming a part hereof, in which.

Referring now especially to FIGS. 1-4, the projector in its preferred form comprises a base portion 11 which may be described as trough-shaped, with side walls flared or inclined outwardly in an upward direction. The front of the trough rests upon two screw feet 13, and the rear end upon a single centrally located screw foot 15, all three of these having convenient knobs for manual rotation to screw the adjustable feet further into or out of the bottom of the body 11, so as to level the projector or to place it at any desired inclination.

Rising from the trough-like base 11 is a central housing portion 17 which is narrower than the top of the base 11 and set inwardly from the lateral edges of the base 11 at both sides. On top of this portion 17 is a roof or cover portion 19 which is somewhat T-shaped in plan, the rear portion of the cover 19 being only a trifle wider than the housing 17, while the front portion of the cover is considerably wider and overhangs the housing 17 at both sides thereof, like the eaves of a roof.

In the top of the cover portion 19 of the casing there is a double flap comprising a rear portion 21 and a front portion 23 hinged to each other at 25, the two portions being separately liftable to obtain access to parts of the interior, or both portions being liftable out of the cover 19 at once, if desired. By lifting the flap 21, one obtains access to the rear portion of the casing 17, which rear portion contains the illuminating system comprising the lamp, the reflector, and the condenser lens all of conventional construction the details of which are not important to the present invention, so are not illustrated. The rear wall of the casing portion 17 is provided with ventilation louvers 27, and some of the stray light from the illumination system comes out through the louvers and falls upon the horizontal ledge 29 at the top rear portion of the base 11, thus giving some illumination to the bank or panel of control buttons or switches which are located on this ledge 29, and making it easy for the operator to locate the proper button when he is operating the projector in a darkened room.

Under the front flap 23 of the cover, which may be separately opened easily by means of the handle 31, there are located the drive parts for actuating the picture or slide changing mechanism. The main motor and the cooling fan are located in the trough-like base portion 11.

The front wall of the casing portion 17 carries the forwardly projecting tube 33 which serves as a guide tube for the forwardly and rearwardly movable mount 35 of the lens system 37, these parts all being mounted on the optical axis, of course. The mount 35 along with the lens 37 is movable forwardly and rearwardly for focusing the image upon a viewing screen at any desired distance, the focusing movement preferably being accomplished by a separate focusing motor as further mentioned below.

On top of the base 11, at the two sides of the housing 17, are two magazine receiving channels or guideways for receiving, in longitudinally movable fashion, the two slide or picture magazines. For example, on the right hand side of the projector (using the terms "right" and "left" from the standpoint of a person located behind the projector and facing forwardly toward the viewing screen) the magazine channel comprises a bottom guide rail 41 and side guide rails 43 (FIGS. 1, 2, and 4) for cooperation with a magazine 45 for holding a series of slides or transparencies 47 of one size, for example, a size of 5 x 5 centimeters. On the other or left hand side of the projector are similar parts, but of a different size, including a bottom rail 51 and side rails 53 (FIGS. 1 and 3) adapted to receive a magazine 55 for holding slides 57 of a different size, such as a size of 7 x 7 centimeters.

The bottom guide rails 41 and 51 are of different heights, the rail 41 for the smaller slides being somewhat higher than the rail 51 for the larger slides, so that as the magazine containing the slides travels longitudinally along the guide rail, the slides in the magazine, as they pass the projection plane, will be raised to the proper height so that the center of the slide is at the same height as the optical axis. This requires the smaller slide to be raised somewhat higher than the larger slide.

One of the features of the present projector is that the projection plane or projection position for a slide of one size, is axially offset relative to the projection position for a slide of the other size. Thus for the smaller size slides 47, there is a slide receiving channel 61 (FIGS. 2 and 4) which lies in a plane perpendicular to the optical axis and which opens through the right hand side wall of the housing portion 17, so that slides from the right hand magazine 47 may be moved horizontally into this channel 61 into projection position, and may be brought back from this channel into the magazine 45. Similarly, but in a position spaced rearwardly from the channel 61, there is a second slide receiving channel 63 (FIG. 3) which opens through the left hand side wall of the casing portion 17 and which is of the proper size to receive the larger slides 57 in the magazine 55 mounted on the left side of the projector.

As further explained below, motor driven mechanism is provided for moving individual slides from a magazine into the proper one of these slide channels 61, 63 to bring the individual slide into projection position, and when the user has completed looking at the projected image of the slide, the motor driven mechanism moves the slide back out of the projection channel to the magazine from which the slide was taken, then advances the magazine one step in order to bring the next slide into the projection plane, and moves the next slide from the same magazine into projection position. Since the projection planes for the two sizes of slides are offset axially from each other, it follows that there is no danger of collision of a slide of one size with a slide of another size, even if two slide magazines are simultaneously mounted on the projector; hence there is no danger of physical damage or jamming of one slide by contact with another slide from the other magazine on the opposite side of the projector. Of course optical interference would occur if two slides of two different sizes were simultaneously moved into their respective projection positions, but at least this would not jam or damage any parts of the mechanism nor the slides themselves, and even this optical interference can be easily avoided by using any simple form of mechanical interlock to prevent a slide magazine from being mounted on one side of the projector if another slide magazine is already mounted on the other side thereof.

Figure 5:
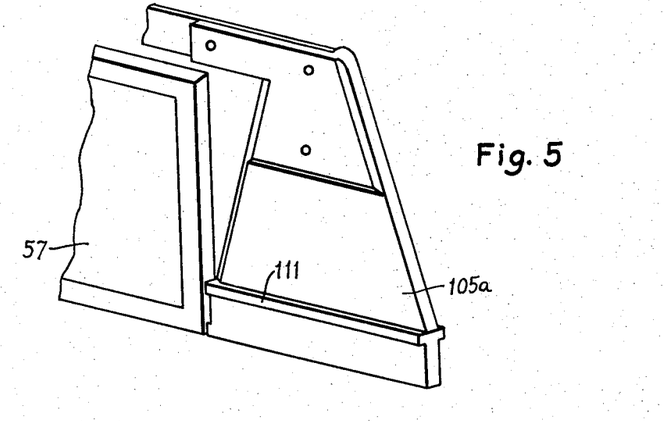
FIG. 5 is a perspective view of a slide pusher member and a fragment of a slide.
Figure 6:
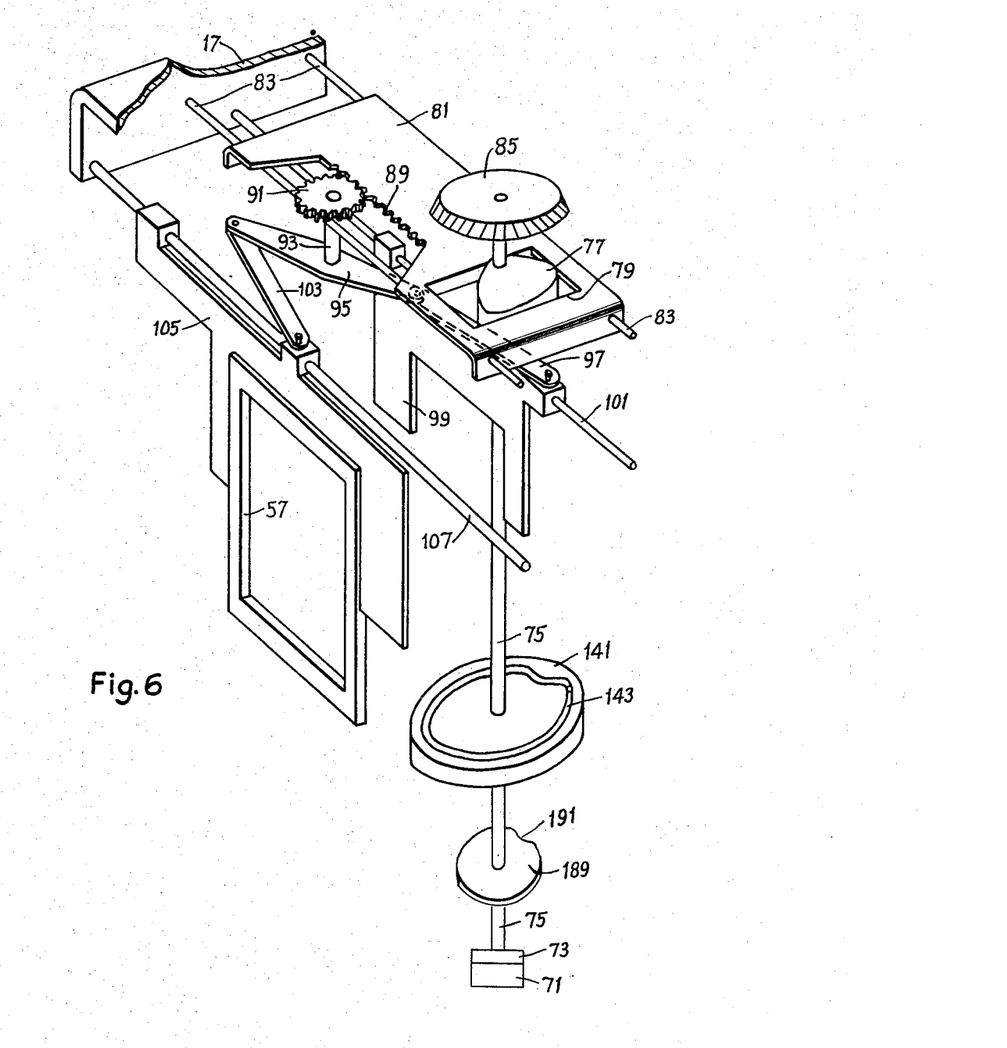
FIG. 6 is a schematic perspective view of the slide changer mechanism and associated parts.

Referring now to the details of the slide changing mechanism, as best seen in FIGS. 5 and 6, there is mounted in the base 11 of the projector a constantly running electric motor diagrammatically indicated at 71 in FIG. 6. This motor through a magnetic clutch indicated diagrammatically at 73, drives a vertical shaft 75 which extends up into the casing portion 17 and is provided near its upper end with a cam 77 which operates in a driving slot 79 of a transverse slide member 81 which slides crosswise of the casing on stationary guide rods 83. The cam 77 may be of any convenient shape to cause the slide 81 to reciprocate back and forth crosswise of the projector, in the desired manner. Preferably this cam 77 is what is sometimes called an arcuate triangle cam. That is, it is of generally triangular shape, with rounded corners and with each of the sides of the triangle being bowed or convex rather than being straight. This has the advantage, over other forms of cam, that it will serve to move the slide member 81 relatively quickly from one extreme position to the other (the surfaces of the cam pressing on the appropriate lateral edges of the driving slot 79) and then it will cause the slide member 81 to dwell or remain momentarily stationary at either end of its motion, notwithstanding continued rotation of the shaft 75 and cam 77. It has the further advantage that, because of this dwell at either end of the reciprocating motion of the slide member 81, the parts do not have to be made with such close tolerances and do not have to be adjusted to such a close and accurate extent during the initial assembly of the projector, because a slight difference in the angular position at which the cam 77 comes to rest will not make any difference in the end position of the slide member 81 and thus will not matter.

At the top of the shaft 75 is a finger knob 85 which may be grasped to turn the mechanism by hand when necessary. This finger knob 85 is not normally needed and so it preferably is not located above the top of the projector, but lies immediately beneath the previously mentioned flap 23 which gives access to the interior of the casing portion 17.

The slide member 81 is provided with gear rack teeth 89 which mesh with a pinion 91 fixed to a short vertical shaft 93 which rotates in stationary bearings. The bottom end of this shaft carries a two-armed lever 95. One arm thereof is connected by the link 97 to the slide pusher or changer indicated in general at 99, which slides on the stationary guide rod 101 extending transversely of the machine. The other arm of the two-armed lever 95 is connected by a similar link 103 to the other slide pusher or changer 105 which slides on a stationary guide rod 107 extending transversely of the machine.

In the somewhat schematic illustration in FIG. 6, the slide pushers 99 and 105 have been somewhat simplified in shape, for the sake of clarity. In actual practice, the depending portions which engage the outer side edges of the respective slides to draw them into projected position are not simple depending rectangles as seen in FIG. 6, but are of the shape shown at 99a and 105a, respectively, in FIGS. 1, 3, and 5. On each of these pushers, a thickened portion 111, approximately as thick or slightly thicker than the mount of the photographic slide or transparency 47 or 57, serves to make contact with the slide and push it into the projector into proper projecting position, at the proper time.

In addition to the mechanism for moving the slide into the housing 17, into projection position, there is also mechanism for moving the entire slide magazine longitudinally, parallel to the optical axis, to bring the different slides therein successively into cooperative relation to the slide pusher or changer 99 or 105, as the case may be. The mechanism for moving one magazine longitudinally is the same as that for the other magazine, so a description of one will suffice for both.

Figure 7:
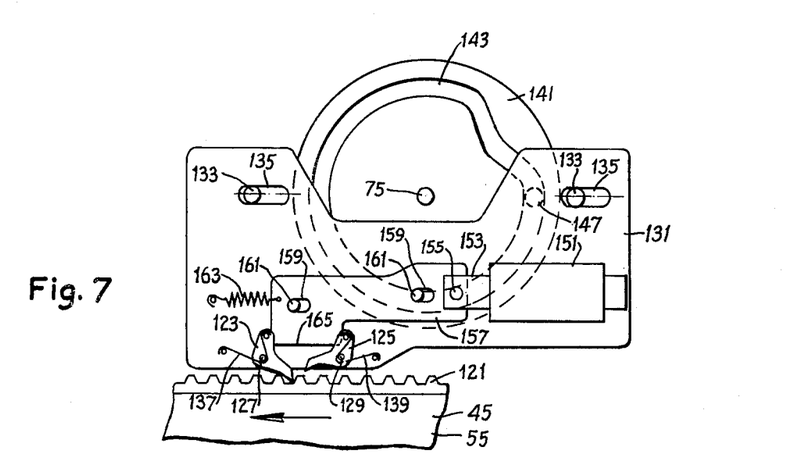
FIG. 7 is a plan of the driving mechanism for moving the slide magazine longitudinally.

Referring now to FIG. 7 as well as the previously mentioned FIG. 6, each magazine 45 and 55 is provided along its inner lateral edge with a longitudinally extending toothed rack 121, the pitch or spacing of the teeth being the same as the spacing of the individual slides within the magazine. The teeth of this rack are arranged to be engaged by either one of the pivoted dogs or pawls 123 and 125, pivoted respectively at 127 and 129 to a longitudinal slide member or plate 131 mounted to move longitudinally (parallel to the optical axis) on fixed pins 133 which engage in longitudinal slots 135 of the slide member. Springs 137 and 139 respectively tend to move both of the pawls or dogs 123 and 125 into engagement with the rack teeth 121.

To move the slide member 131 longitudinally, the main shaft 75 (FIG. 6) is provided with a cam member 141 which has a cam slot 143 constituting a box cam. Through most of its length, the groove or slot 143 is circular and concentric with the shaft 75. But at one point the cam slot 143 has an irregularity or dip 145, the midpoint of which is offset radially with respect to the main portion of the cam slot 143 to an extent equal to the spacing or pitch of the teeth of the rack 121. A pin 147 on the slide plate 131 enters the cam groove 143, 145 so that as the cam member 141 turns, the slide plate 131 will remain stationary during most of the rotation of the cam member, but at one point, when the irregularity 145 reaches the pin 147, the slide plate 131 will momentarily be moved (leftwardly when viewed as in FIG. 7) through a distance equal to the pitch of the gear rack teeth 121, and then will be moved back again to its normal position.

If one of the pawls or dogs 123 and 125 is engaged with the rack teeth 121 at this time, it is seen that the movement of the slide plate 131 will correspondingly move the magazine 45 or 55 longitudinally, and the motion of the magazine will be in one direction or the other, depending upon which one of the pawls or dogs is engaged. To determine this, the pawls 123, 125 are preferably controlled electrically by solenoid means. There may be a separate solenoid operatively connected to each of the pawls, but in the preferred construction a single solenoid is used to control both of them.

This solenoid is shown at 151 in FIG. 7, and is mounted on the slide plate 131. The armature 153 of the solenoid is pivotally connected at 155 to a switching plate 157 movable through a limited range relative to the slide plate 131, by means of slots 159 of the switching plate engaging pins 161 carried by the slide plate 131. A spring 163 tends constantly to move the switching plate 157 to its extreme leftward position, and it will occupy this position when the solenoid 151 is not energized. However, when the solenoid 151 is energized, it will pull rightwardly on the switching plate 157 with greater force than the spring 163, and thus will move the switching plate to its rightward position, which is the position shown in FIG. 7.

On this switching plate 157 is a shoulder or projection 165, one end of which is adjacent the pawl or dog 123 and the other end of which is adjacent the pawl or dog 125. When the solenoid 151 is not energized, so that the spring 163 is allowed to move the switching plate 157 to its leftward limit of motion, the left end of the projection 165 will engage the left hand pawl 123 and swing this pawl on its pivot 127 to an ineffective position out of contact with the rack teeth 121 and at the same time the right hand end of the projection 165 will release the other pawl 125 so that its spring 139 will move it into effective engaging position with the rack teeth 121. Therefore a reciprocation of the main slide plate 131, caused by rotation of the cam member 141, will serve to feed the magazine 45 (or 55) one stop in a leftward direction as shown by the arrow A in FIG. 7. But if the solenoid 151 is energized and is maintained in energized condition, then the switching plate 157 will move rightwardly to the position illustrated in FIG. 7, so that the right hand end of the projection 165 will swing the pawl 125 to an ineffective position and the left hand end of the projection 165 will release the other pawl 123 so that its spring 137 will move it to its effective position, engaging the rack teeth. Then a reciprocation of the main slide plate 131 will serve to move the magazine 45 (or 55) in a rightward direction, contrary to the direction of the arrow A.

The position of the dip 145 in the cam 143 is so oriented with respect to the position of the cam 77 which controls the slide pushers, that this reciprocation of the slide plate 131 occurs when the slide pushers pause or dwell at the extreme outer ends of their movements. In other words, the longitudinal feeding of a magazine always occurs when the slide pusher or slide transport mechanism is in proper position to permit such longitudinal movement of the magazine, to bring the next slide or transparency into the transverse plane of the pusher, ready for the next slide to be pushed into projection position.

Figure 8:
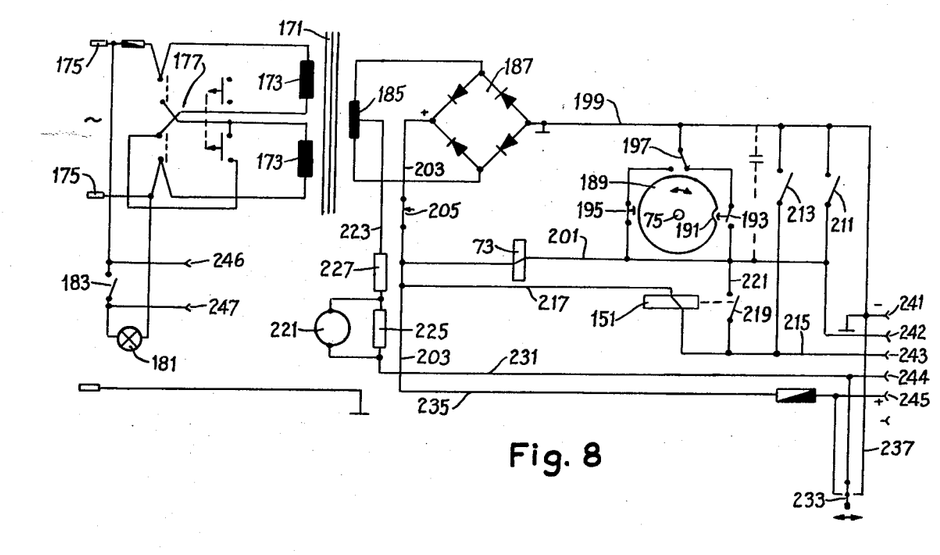
FIG. 8 is a wiring diagram of certain electrical connections.

Reference is now made to FIG. 8, showing the electrical circuit diagram for causing the proper operation of the mechanical parts thus far described. The main driving motor, indicated schematically at 71 in FIG. 6, is indicated in FIG. 8 by its core 171 and its windings 173, and is connected to the source of current by conventional prongs 175, through a change-over switch 177 so that the windings 173 may be connected to the source of current either in parallel or in series, to adapt the motor to use with different line voltages. The main illuminating lamp 181 of the projector is connected to the same source or current 175 through a disconnecting switch 183, so that the lamp may be turned on and off as desired, without affecting the operation of the motor. This arrangement has the advantage that the lamp can be turned off, but the motor and the cooling fan driven thereby will continue to operate until the prongs 175 are disconnected from the line, and vice versa.

In addition to the main windings 173, the motor 71 also has an auxiliary winding 185 with a center tap which, through a rectifier 187 with a Graetz circuit, supplies the control current for the magnetic clutch 73 (see FIG. 6 as well as FIG. 8) and for the direction changing or switching solenoid 151 (see FIG. 7 as well as FIG. 8). The main drive shaft 75 is provided with a cam disk 189 circular through most of its periphery but having the depression or notch 191 at one point of its periphery. This could be formed as a notch on the same cam 141 which controls the feeding of the slide magazine, but for the sake of simplicity of illustration it is shown (see FIG. 6 as well as FIG. 8) as a separate cam. This cam controls the plungers of two switches 193 and 195 set diametrically opposite each other with respect to the cam, and one or the other of these switches 193 and 195 can be connected through the change-over switch 197 to the negative side conductor 199 of the output circuit of the rectifier 187.

The opposite sides of the switches 193 and 195 (that is, the sides opposite to those connected to the switch 197) are both connected to the circuit conductor 201, which leads through the above mentioned magnetic clutch 73 to a circuit conductor 203 which is connected to the positive side of the output circuit of the rectifier 187, but through a safety switch 205 operatively connected to the flap 23 of the removable cover, so that if this cover flap is opened it will break the electric circuit at the switch 205 and thus prevent accidental operation of the parts while the cover flap is open and while a person's fingers might perhaps be inside the casing, in the path of moving parts of the mechanism.

There is a push button switch 211 which serves to operate the device through one normal cycle of operation, to remove from projection position any slide or transparency which is already in such position, return it to its magazine, advance the magazine one step, and push the next slide from the same magazine into projection position. It is seen from FIG. 8 that closing the switch 211 will complete the circuit between the circuit conductors 199 and 201, thus operating the magnetic clutch 73 to connect the shaft 75 to the constantly running motor 71. Assuming that the change-over switch 197 is in the position shown in FIG. 8 (which is the normal position of this switch) it is seen that as soon as the shaft 75 begins to turn, the notch 191 of the cam 189 will pass beyond the switch 193 and thereafter will keep this switch closed. Therefore the closing pressure on the switch 211 can be released as soon as the cam begins to turn, and the switch 193 will now keep the circuit closed and continue the driving of the shaft 75 until the shaft has completed one full revolution, whereupon the notch 191 will open the switch 193 and the parts will stop.

During this single revolution of the shaft 75, the slide carriers or pushers 99 and 105 will move from their normal rest position at the inner ends of their ranges of travel, in an outward direction laterally from the optical axis, thereby carrying any transparency which is already in the machine outward to its magazine. When the carriers or pushers 99 and 105 reach their outward limit of motion, there will be a slight dwell or stationary interval, due to the shape of the cam 77, and during this dwell the portion 145 of the cam 143 will engage the pin 147 of the slide plate 131, to cause a longitudinal feeding of the slide magazine by one step in one direction or the other. Then, still during the second half of the same single revolution of the shaft 75, the cam 77 will move the slide member 81 to operate the slide carriers or pushers 99 and 105 so that the next succeeding transparency from the magazine will be drawn into the casing and placed across the optical axis in proper projection position. Then the notch 191 will open the switch 193 and stop the parts while the slide remains in this projection position, until the next cycle is manually initiated.

If the next following slide is to be projected next, the operator again closes the switch 211 momentarily, and the cycle is repeated once more, to bring the next succeeding slide or transparency into projection position. However, if the operator wishes to go back and project the previous slide once more instead of the next following slide, he momentarily presses another switch 213 instead of the switch 211. This switch 213 does not close the circuit to the conductor 201 directly, but on the contrary it closes the circuit to the conductor 215, which leads through the solenoid 151 and conductor 217 to the conductor 203 which goes to the positive side of the rectifier. Thus when the switch 213 is closed, the first thing that happens is that the solenoid 151 is energized, thereby changing the position of the feed pawls so that the advance feed pawl 125 (FIG. 7) is made ineffective, and the reverse feed pawl 123 becomes effective. At the same time that the solenoid 151 operates the feed pawl, it also closes the switch 219 (FIG. 8) which is operatively connected to this solenoid, and this in turn completes the circuit, through the conductor 221, to the conductor 201 which leads through the magnetic clutch 73, thereby starting the rotation of the shaft 75. The cycle of one complete rotation of the shaft 75 will now occur, just as previously described above, except that the longitudinal feeding of the slide magazine 45 or 55 will now be in a reverse direction, rather than in a forward direction. Otherwise the operation will be the same as previously described, and the switch 193 will open at the end of one complete revolution so as to stop the motion at the end of the cycle, as above described.

At the end of the normal cycle of a single rotation of the shaft 75, when the notch or recess 191 opens the switch 193, the slide pushers or conveyors are in their central positions mainly within the housing 17, but with the outer edges of the pushers projecting slightly from the housing across the path of the slide magazines 45 and 55. The magazines should not be moved longitudinally when the pushers are in this position. It is for this reason that the above-mentioned change-over switch 197 is provided, thereby enabling the pushers to be brought to rest in their outermost positions illustrated in FIG. 1, where they allow complete freedom of longitudinal movement of the magazines 45 and 55.

When the change-over switch 197 is shifted from its normal position shown in FIG. 8 to its alternative position, it disconnects the switch 193 from the circuit and immediately connects the switch 195 in the circuit, which it will be recalled is at a point on the cam 189 diametrically opposite from the switch 193. Because the cam at this time is holding the switch 195 closed, the shifting of the change-over switch 197 will immediately cause the circuit through the clutch 73 to be completed, and the shaft 75 will turn through half of a revolution, until the notch or recess 191 comes around to the switch 195, which will open at this point and thereby stop the mechanism with the slide pushers or changers in their outward position shown in FIG. 1. The slide magazine can then be removed longitudinally, and another slide magazine can be substituted. Then when the change-over switch 197 is restored to its normal position, disconnecting the switch 195 from the circuit and connecting the switch 193 into the circuit, the switch 193 will be closed at this time and therefore the shaft 75 will immediately make another half revolution until the notch or recess 191 comes around to the switch 193, thereby opening this switch and stopping the parts in the normal rest position with the slide changers or pushers at the innermost ends of their respective paths of travel.

Preferably the switch 197 is spring biased into its normal position shown in FIG. 8, so that it will return to this position if the operator lets go of the switch. Thus he can hold the switch 197 in the magazine-changing or second position with one hand, while he inserts or removes the slide magazine with the other hand. If it is desired to leave both hands free for inserting or removing a magazine, the switch 197 can be moved to its second position, and then, while temporarily held in this position, the main current supply plug 175 can be disconnected from the source of current, thus leaving the slide pushers or changers stationary in their extended position.

The forward and backward movements of the lens mount 35, for focusing purposes, are preferably performed by a small supplementary motor 221, operatively connected to the lens mount in any known manner, the details of which are not important for purposes of the present invention. One side of the circuit of this motor leads through a conductor 223 to the center tap of the winding 185 of the main motor, thereby enabling the focusing motor 221 to be operated by half of the direct current voltage produced by the rectifier 187, while the rectifier operates as a full wave rectifier producing the full voltage for operation of the magnetic clutch 73 and the solenoid 151. The focusing motor 221 preferably has both a parallel resistor 225 and a series resistor 227, the series resistor causing slow starting of the motor and the parallel resistor permitting quick braking when the circuit of this motor is opened, thereby attaining a very sensitive forward and rearward actuation of the motor driven focus mechanism. The second side of the circuit of the focus motor 221 (that is, the side not connected to the tap of the winding 185) is connected by a conductor 231 to a pole changing switch 233, by means of which the conductor 221 may be connected at will either to the conductor 235 leading to the conductor 203 and to the positive side of the rectifier, or to the conductor 237 leading to the conductor 199 at the negative side of the rectifier. Operation of the pole changing switch 233 thus serves to drive the focusing motor 221 in either desired direction, to change the focus of the projector.

This arrangement of the electrical circuits is particularly well adapted to being led out to a remote control. As seen at the right hand side of FIG. 8, all necessary controls can be accomplished from any desired distance, through a five conductor cable having a five prong plug fitting into a five contact receptacle indicated in general at 240 in FIG. 4. The individual circuit contacts of the receptacle 240 are indicated for convenience at 241 through 245, respectively, in FIG. 8. It is seen that if, at a remote point, a contact is closed between the members 241 and 242, this has the same effect as closing the switch 211, and will initiate an ordinary feeding cycle to feed the next slide in a forward direction into projection position. If the circuit is closed between the members 241 and 243, this will have the same effect as closing the switch 213, causing reverse feeding; that is, the last previous slide in a reverse direction will be fed into projection position, instead of the next slide in a forward direction. Establishing contact at a remote point between the members 244 and 245 will connect the focusing motor 221 to the positive side of the output circuit of the rectifier 187, causing the focusing motor to turn in one direction. A remote connection between the members 241 and 244 will connect the focusing motor 221 to opposite or negative side of the rectifier 187, turning the focusing motor in the opposite direction. Thus all essential operations can easily be controlled remotely, by means of a very simple five-conductor cable plugged into the receptacle 240, with appropriate switches of conventional kind at the far end of the cable.

Figure 1:
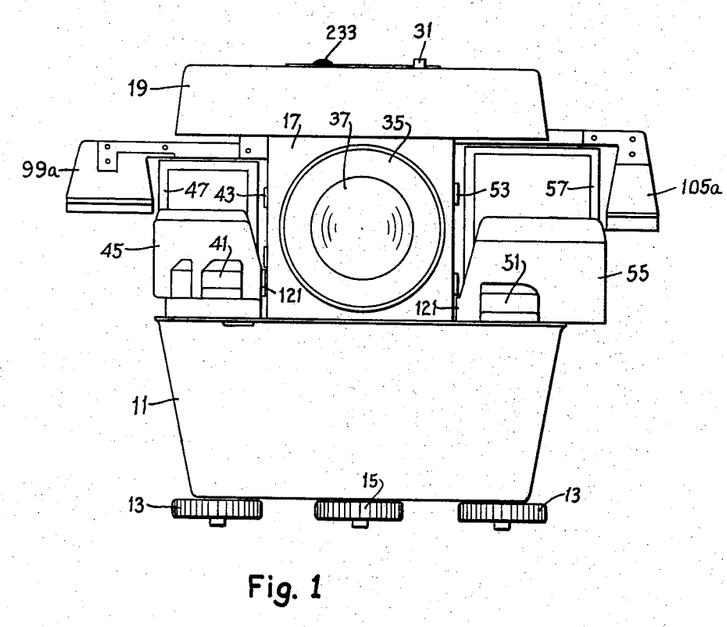
FIG. 1 is a front elevation of a projector in accordance with a preferred embodiment of the invention.
Figure 2:
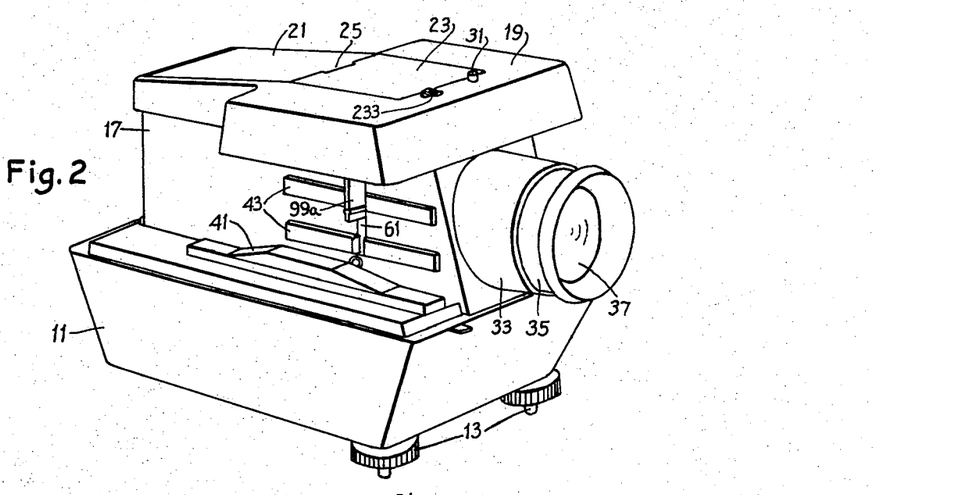
FIG. 2 is a perspective view thereof, looking toward the front right corner, with the slide magazine removed.
Figure 3:
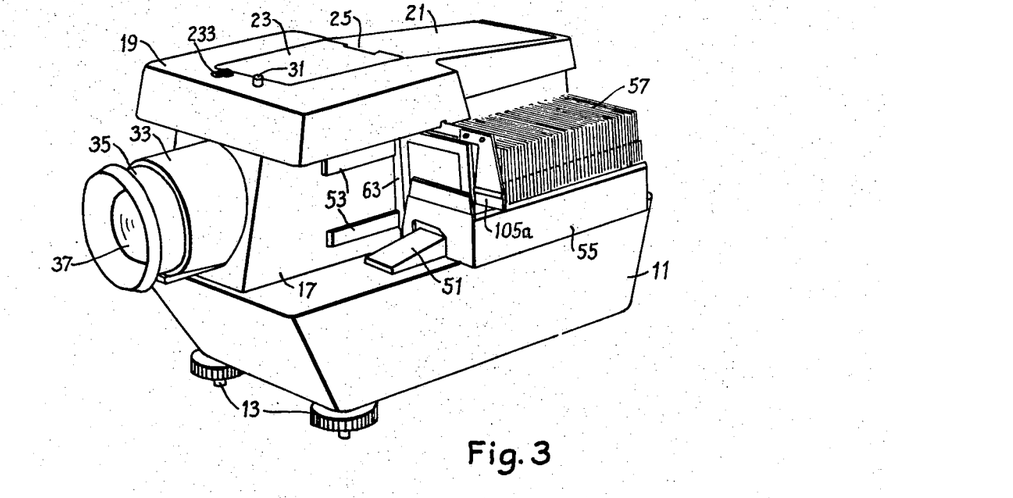
FIG. 3 is a view similar to FIG. 2 but looking toward the front left corner, and with one of the slide magazines in place.
Figure 4:
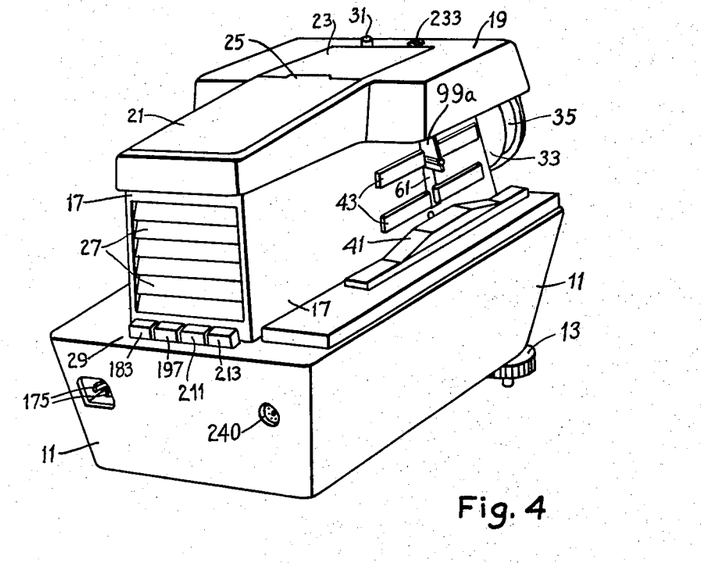
FIG. 4 is a perspective view of the projector, looking toward the right rear corner.

When operation from a remote point is not desired, the projector is very conveniently controlled from the switches mounted on the top of the main body 11 at the rear thereof, as indicated in FIG. 4. These switches are grouped conveniently together in a bank, on the ledge at the top of the rear of the main body 11, which ledge may be considered a control panel. As already mentioned above, a certain amount of light from the illumination system within the projector comes out through the ventilation louvers 27, thus illuminating the switches 183, 197, 211, and 213 to a sufficient extent so that they can be easily manipulated by the operator. The motor focusing switch 233 may conveniently be placed on the forward part of the top or cover of the projector.

It is not necessary to provide any remote control for the change-over switch 197, because this is used only for the purpose of stopping the mechanism in the outward position of the slide pushers, so that a slide magazine can be removed or inserted in the machine. When the operator is to perform the operation of inserting or removing a slide magazine, he is of course physically present at the projector, rather than at a remote point, and so the change-over switch 197 would be useless at a remote point. It is preferably placed at the rear of the projector, as part of the bank or panel of switches previously mentioned.

If a seven conductor cable is used for remote control rather than a five conductor cable, the prongs on the other two conductors thereof can enter the prong sockets 246 and 247 shown at the left end of FIG. 8, so that when such conductors are connected to or disconnected from each other at the remote end of the cable, the main lamp 181 of the projector can thereby be turned on or off.

It has already been mentioned that the push button switches are grouped side by side in a bank or control panel at the rear of the projector. This location and arrangement of the switches makes it particularly easy to provide an interlock of any convenient kind (well known per se) to prevent simultaneous operation of switches initiating contrary movements, or movements which should not be performed together. Of the three switches 197, 211, and 213, only one should be operated at any given time, and therefore an interlock is provided which, when any one of the three switch plungers is depressed, prevents depression of the other two switch plungers. The details of such an interlock are not important for purposes of the present invention, several suitable forms of interlocks of this kind being well known, particularly in the adding or computing machine art, where such interlocks are frequently called "single key locks."

Many of the mechanical details herein disclosed are not the invention of the present applicant, but are claimed in the separate application of Richard Weiss and Helmut Finke, Serial No. 77,189, filed December 20, 1960, Patent 3,118,341, granted January 21, 1964. Such details are disclosed herein merely for the sake of giving a complete disclosure of an operative embodiment of the invention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A slide projector comprising means defining a channel for receiving a slide in projection position, means for holding a slide magazine, means for engaging a magazine to advance it step by step past said channel to bring successive slides in said magazine into a position alined with said channel, means for engaging a slide in said magazine alined with said channel and moving such slide from said magazine into projection position within said channel, common drive means for concomitantly driving both said magazine engaging means and said slide engaging means, said drive means including a rotary shaft operatively connected to both of said engaging means, an electric motor for driving said shaft, a cam on said shaft and rotating therewith, an electric circuit effective to cause said motor to drive said shaft when said circuit is energized and to discontinue driving of said shaft by said motor when said circuit is not energized, a first switch in said circuit, said first switch being operated by said cam in such manner that said first switch is open when said shaft and cam are in a predetermined rest position and said switch is closed when said shaft and cam are in any other position, second switch means for temporarily energizing said first mentioned circuit independently of said first switch, to start rotation of said shaft and cam so that said first switch will close and will keep said first mentioned circuit energized independently of said second switch means until said shaft and cam complete one cycle and come again to said rest position, an electric solenoid effective, when energized, to reverse the direction in which said magazine engaging means moves said magazine, and an electric circuit for energizing said solenoid, said second switch means comprising a manually operated switch for energizing said solenoid circuit and another switch operatively connected to said solenoid to be closed when said solenoid is energized, said other switch when closed serving to energize said first mentioned circuit independently of said first switch.

2. A slide projector comprising means defining a channel for receiving a slide in projection position, means for holding a slide magazine, means for engaging a magazine to advance it step by step past said channel to bring successive slides in said magazine into a position alined with said channel, means for engaging a slide in said magazine alined with said channel and moving such slide from said magazine into projection position within said channel, common drive means for concomitantly driving both said magazine engaging means and said slide engaging means, said drive means including a rotary shaft operatively connected to both of said engaging means, an electric motor for driving said shaft, a cam on said shaft and rotating therewith, an electric circuit effective to cause said motor to drive said shaft when said circuit is energized and to discontinue driving of said shaft by said motor when said circuit is not energized, a first switch in said circuit, said first switch being operated by said cam in such manner that said first switch is open when said shaft and cam are in a predetermined rest position and said switch is closed when said shaft and cam are in any other position, second switch means for temporarily energizing said first mentioned circuit independently of said first switch, to start rotation of said shaft and cam so that said first switch will close and will keep said first mentioned circuit energized independently of said second switch means until said shaft and cam complete one cycle and come again to said rest position, an electric solenoid effective, when energized, to reverse the direction in which said magazine engaging means moves said magazine, and an electric circuit for energizing said solenoid, said second switch means comprising a manually operated switch for energizing said solenoid circuit and another switch operatively connected to said solenoid to be closed when said solenoid is energized, said other switch when closed serving to energize said first mentioned circuit independently of said first switch and also to keep said solenoid circuit energized until said shaft and cam complete one cycle and come again to said rest position.

References Cited in the file of this patent

UNITED STATES PATENTS

| | | |
|---|---|---|
| 1,271,929 | Nelson | July 9, 1918 |
| 2,614,458 | Critoph et al. | Oct. 21, 1952 |
| 2,618,209 | Silent | Nov. 18, 1952 |
| 2,784,817 | Lessman | Mar. 12, 1957 |
| 2,838,600 | Salinger | June 10, 1958 |
| 2,872,841 | Thornburn | Feb. 10, 1959 |
| 2,906,168 | Schlafly | Sept. 29, 1959 |
| 2,949,814 | Boughton et al. | Aug. 23, 1960 |
| 2,969,711 | Robinson et al. | Jan. 31, 1961 |
| 3,015,251 | Pollan | Jan. 2, 1962 |

FOREIGN PATENTS

| | | |
|---|---|---|
| 581,383 | Great Britain | Oct. 10, 1946 |